Jan. 10, 1967  G. E. MOORE ET AL  3,297,064
FLUID DELIVERY MEANS

Filed June 8, 1964  2 Sheets-Sheet 1

INVENTORS
GLENN E. MOORE AND
WALLACE D. BOONE,
BY Yungblut, Melville,
Strasser & Foster
ATTORNEYS.

United States Patent Office 3,297,064
Patented Jan. 10, 1967

3,297,064
FLUID DELIVERY MEANS
Glenn E. Moore, Fairfield, and Wallace D. Boone, Cincinnati, Ohio, assignors to Dover Corporation, Cincinnati, Ohio, a corporation of Delaware
Filed June 8, 1964, Ser. No. 373,275
10 Claims. (Cl. 141—383)

This invention deals with means whereby connection may be made with tanks or other apparatus, usually located within a building, for the delivery of volatile fluids from tank trucks or other vehicles. It has been usual in the past to provide at the point of delivery a capped connector box. When the cap is removed a nozzle or elbow member generally attached to the tank vehicle by a flexible conduit may be engaged with an exposed threaded opening in the connector box.

In certain localities local laws or ordinances require that a flexible conduit from a tank vehicle must be connected to a pipe in the box for the reception of the fluid by connecting means, all of which must be vapor-tight, where the fluid being delivered has any appreciable volatility.

It is an object of this invention to provide simple and inexpensive means whereby this requirement may be met.

It is an object of the invention to provide means on the flexible conduit from the tank vehicle and in the connector box which will meet the above requirements, but which can be substituted for threaded members currently in use, without requiring replacement of the connector box and attendant piping.

It is also an object of the invention to provide for a connector box and fitting which, used with the proper connection from the tank vehicle, will meet the above requirements, but can nevertheless be closed in a vapor-tight fashion when the delivery of the fluid is completed and which can be locked to prevent pilfering or damage.

These and other objects of the invention which will be set forth hereinafter or will be apparent to one skilled in the art upon reading these specifications, are accomplished by that construction and arrangements of parts of which an exemplary embodiment will now be described. Reference is made to the accompanying drawings wherein.

Figure 1:
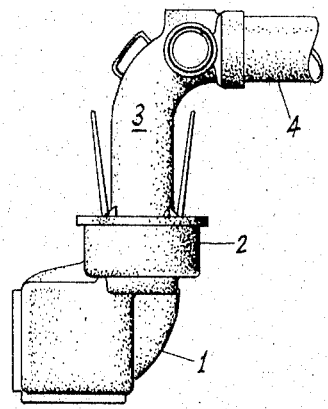
FIGURE 1 is an elevational view of a typical connector box with the nozzle and flexible conduit from the tank vehicle in position for fluid delivery.

Referring now to the drawings, the numeral 1 illustrates a connector box which is in common use for the delivery of fluids. It is provided with a hollow upper portion 2 containing a means to which a delivery spout or nozzle may be connected. Also shown in this figure is a spout or nozzle 3 of elbow-like configuration which may be thought of as connected by a flexible conduit 4, to a tank vehicle.

As has been stated above, the hollow member 2 of the connector box has ordinarily been provided with a fitting having internal screw threads, the nozzle 3 having corresponding external threads. In some instances a threaded connection has been eliminated; and a reduced end of the nozzle 3 has merely been thrust into the upper end of a pipe or tubular connection designed to conduct the delivered fluid to positions of use within the building. In the one instance time will be required to form a vapor-tight connection, and in the other instance no vapor-tight connection may be effected at all.

Figure 3:
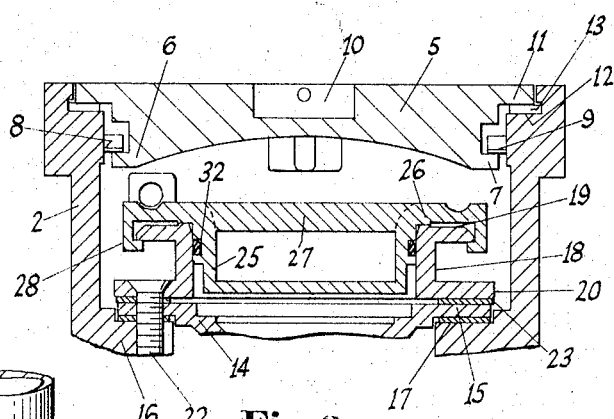
FIGURE 3 is a vertical sectional view of the entrance portion of the connector box showing the aforesaid interior closure and also the conventional outer closure for the box entrance.

The invention is, of course, not limited to the use of connector boxes of the character herein described and illustrated. However, it is common to employ a connector box which is let into the pavement of a sidewalk, a street, or some paved portion of the courtyard of a building. The box is normally embedded in the paving up to the level of the top of the hollow entrance portion 2; and this portion is provided with a closure cap at the pavement level. Such a closure is illustrated in section at 5 in FIGURE 3. It has ears 6 and 7 adapted to engage beneath pins 8 or 9 in the entrance portion of the connector block 2 so as to hold the cap against dislodgment. The cap is installed by placing it in position such that the ears pass the pins, and then rotating it by means of a tool engaged in a socket 10 in the cap until the ears engage beneath the pins. The cap usually is provided with a peripheral flange 11 which lies opposite a shoulder 12 on the member 2 with the interposition of a sealing gasket 13 therebetween.

There will be a pipe (not shown) leading from the fitting 2 to fuel storage means which may be located inside or outside a building. The pipe may be provided with a fitting 14 comprising a flange 15 paralleling a ledge 16 formed as a part of the housing 2. A gasket 17 may be utilized to form a vapor-tight connection between these elements.

The practice of this invention makes use of a supplementary fitting having a cylindrical body 18 and upper and lower flanges 19 and 20. The lower flange parallels the flange 15 above described and is provided with countersunk holes 21 at intervals for the reception of bolts 22 having threaded engagement with the ledge 16 for holding the fitting in place. A gasket 23 may be placed between the flanges 20 and 15 so as to effect a vapor-tight joint.

Figure 2:
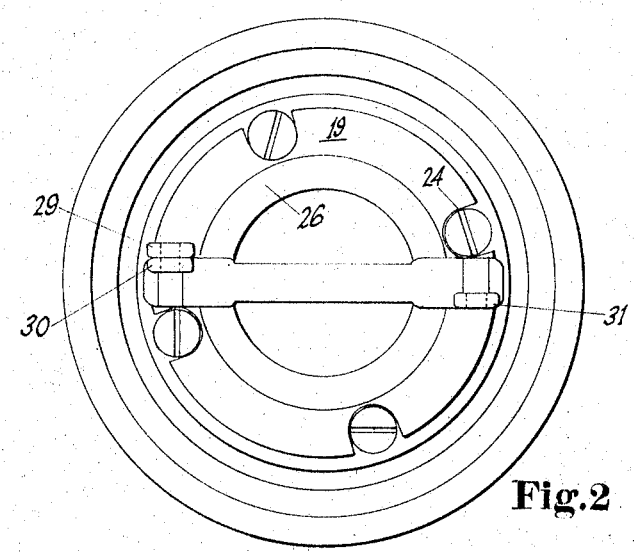
FIGURE 2 is a top plan view of the entrance end of the box showing an inner closure means in position.
Figure 5:
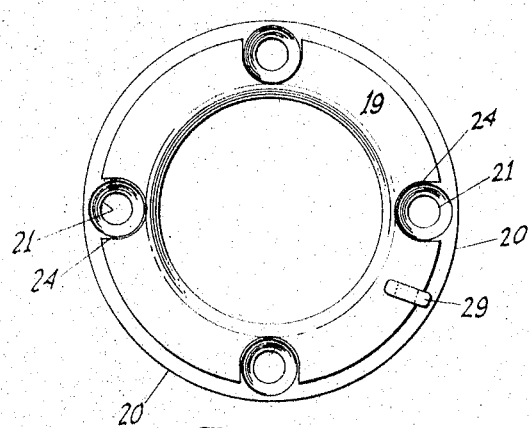
FIGURE 5 is a top plan view of a fitting of this invention which may be substituted for conventional fittings already in use.
Figure 6:
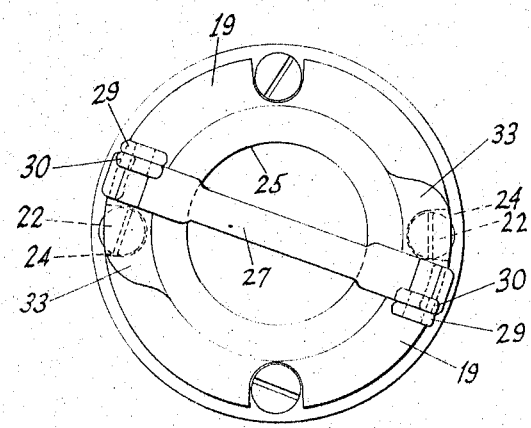
FIGURE 6 is a top plan view of a cap closure for the fitting of FIGURE 5.

The upper flange 19 of the fitting 18 is provided with recesses 24 above the holes 21 so that the bolts 22 may be manipulated. The flange 19 also serves as a means for the attachment of a removable cover member for the pipe, and for the attachment of a nozzle element when fuel is being dipsensed. The cover member has a hollow body 25 of an outside diameter such as to permit it to enter the hollow interior of the fitting 18. It has a portion 26 adapted to rest upon the top inner periphery of the member 18; and it has a handle element 27 extending diametrically across it so that the cover member may be manipulated. End portions of the handle member extend beyond the flange 19 and project downwardly and inwardly as at 28 in FIG. 3. The portions will be referred to as ears, and their purpose is to enter the recesses 24 of the flange 19 and then to engage beneath the flange upon slight rotation of the cover member so as to hold the cover member in place. To lock it in place, the flange 19 is provided with an upstanding perforated lug 29 as shown in FIGURES 2, 5 and 6. The handle member 27 is provided at its ends with similar lugs 30 and 31; and the arrangement is such that when the cover is put in place and rotated to lock it, one or the other of the lugs 30 or 31 will come against the lug 29. Locking may then be accomplished by passing the hasp of a padlock through the meeting lugs.

It is necessary to seal the cover member 25 to the fitting 18. While this may be accomplished in any way desired, it is best done by providing an O-ring 32 in an appropriate recess in the cylindrical body of the cover 25.

As illustrated in FIG. 6, it does not constitute a departure from the spirit of the invention to provide the cover member 25 with upper peripheral flange portions 33 of a width such that, when the cover is in place, the flange portions 33 will lie above the flange 19, covering at least one of the openings 24 therein and preventing access to the bolt 22.

The construction thus far described is used in connection with a nozzle element and hose from a fuel delivery vehicle. When fuel is to be delivered, the cap 5 will first be removed and set aside. Then the cover member 25 will be unlocked, slightly rotated and disengaged from the fitting 18 by an upward movement. The nozzle 3, which may otherwise have any desired form, will be provided with a nose portion 34 adapted to enter and make a vapor-tight connection with the fitting 18. The nozzle end may be provided with an O-ring 35 for sealing purposes.

Figure 4:
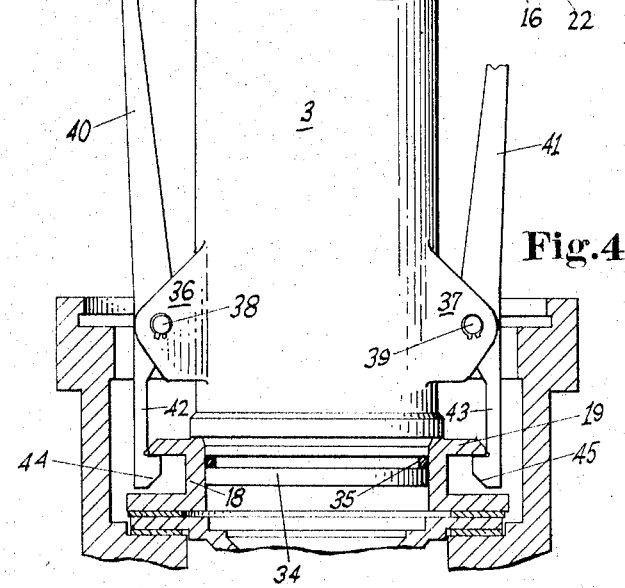
FIGURE 4 is a vertical sectional view of the entrance portion of the connector box equipped with a fitting contemplated by this invention, and a nozzle means coacting therewith in a vapor-tight fashion.

Means are provided to hold the nozzle in place on the fitting 18 when inserted therein. These means may take various forms. One form is illustrated in FIGURE 4, and has the advantage of providing a positive lock not subject to accidental release. A pair of spaced ears is cast on either side of the body of the nozzle 3 and above the end piece 34. In FIGURE 4 an ear of each pair is shown at 36 and 37 in elevation. Locking levers are pivoted to the respective pairs of ears by means of pintles 38 and 39. The locking levers comprise upstanding arms 40 and 41 and downwardly depending locking elements 42 and 43. These elements have inturned end pieces as shown in FIGURE 4, which end pieces are adapted to engage beneath the flange 19 to hold the nozzle in place. The end pieces of the locking levers are preferably so configured as to be larger than the recesses 24 in the flange 19 so that the rotative position of the nozzle 3 with respect to the fitting 18 will not affect the locking action. It is preferable to bias the locking levers 40, 41 in the locking position. This may be done as well understood in the art by coil springs embracing the pintles 38, 39, which springs have respectively two extending legs each, one leg bearing against the nozzle 3 and the other leg bearing against one of the locking levers 40, 41. Thus in order to release the nozzle from fitting 18 it will be necessary to move the the upstanding portions 40 and 41 of the locking levers toward the body of the nozzle 3. If desired, however, the lower inner corners of the locking configurations on the levers may be chamfered as at 44 and 45, to permit the nozzle to be installed and locked by a simple downward thrust thereof.

The nozzle will be installed and locked in position as illustrated in FIGURE 4 when the cover member for the fitting 18 has been removed. The filling operation will then go forward to the extent desired. At the conclusion of the filling operation the upwardly extending portions 40 and 41 of the locking lever will be moved inwardly or toward each other manually. The nozzle end will then be withdrawn from the fitting 18 and the fitting cap replaced and preferably locked in position. Finally the cover member 5 for the housing 2 will be replaced.

Modifications may be made in the invention without departing from the spirit of it. The invention having been described in an exemplary embodiment, what is claimed as new and desired to be secured by Letters Patent is:

1. In a device for effecting both a vapor-tight connection between a filling nozzle and a receiving conduit and for effecting a vapor-tight connection between the said receiving conduit and a cover means therefor, the combination of a hollow fitting having upper and lower spaced flanges, said fitting having an interior surface defining an unobstructed central opening, means for effecting attachment of the lower flange of said fitting to said conduit means, a removable cap member having a body portion for entering the opening of said fitting, said body portion having an exterior surface adapted to lie adjacent said interior surface of said fitting, means for effecting a vapor-tight connection between said interior and exterior surfaces, and releasable means for holding said cover member in place on said fitting, said last mentioned means engaging the upper flange of said fitting.

2. The structure claimed in claim 1 wherein the upper flange of said fitting has at least one pair of opposed notches therein, and wherein said cover member has downwardly extending locking ears adapted to pass through said notches and engage beneath said upper flange upon rotation of said cover member.

3. The structure claimed in claim 1 in combination with a nozzle element having an end portion adapted to extend within the opening in said fitting, means for sealing the end portion of the nozzle element to said fitting and means for releasably locking the nozzle element in said fitting.

4. The structure claimed in claim 1 in combination with a nozzle element having an end portion adapted to extend within the opening in said fitting, means for sealing the end portion of the nozzle element to said fitting and means for releasably locking the nozzle element in said fitting, said last mentioned means comprising means on said nozzle for engaging beneath the upper flange of said fitting.

5. The structure claimed in claim 4 wherein the means for holding the nozzle element to said fitting comprises biasing locking levers pivotally affixed to said nozzle element.

6. The structure claimed in claim 5 wherein the upper flange of said fitting has at least one pair of opposed notches therein, and wherein said cover member has downwardly extending locking ears adapted to pass through said notches and engage beneath said upper flange upon rotation of said cover member.

7. The structure claimed in claim 6 wherein the lower flange of said fitting is bolted to a flange on said conduit, and wherein the notches in the upper flange of said fitting are so located as to permit access to the bolting means.

8. The structure claimed in claim 7 wherein the cover member has an upwardly open body with a handle extending thereacross whereby said cover member may be rotated, there being mating lugs on said cover member and on the upper flange of said fitting, which lugs are adapted to be engaged by locking means.

9. The structure claimed in claim 4 wherein said end portion of said nozzle element has an exterior surface adapted to lie adjacent said interior surface of said fitting, means for effecting a vapor-tight connection between said interior surface and said exterior surface of said nozzle element.

10. The structure claimed in claim 8 including peripheral flange elements on said cover member, said flange elements overlying said notches in said upper flange of said fitting when said lugs are engaged by said locking means, whereby access to said bolting means is prevented.

References Cited by the Examiner

UNITED STATES PATENTS

| | | | |
|---|---|---|---|
| 2,177,123 | 10/1939 | Wittenberg | 220—40 |
| 2,738,095 | 3/1956 | Carter | 220—40 |
| 3,133,566 | 5/1964 | Hoss | 141—382 X |

FOREIGN PATENTS

| | | |
|---|---|---|
| 597,785 | 5/1934 | Germany. |
| 8,154 | 1904 | Great Britain. |

LAVERNE D. GEIGER, *Primary Examiner.*

H. S. BELL, *Assistant Examiner.*